United States Patent Office

3,380,892
Patented Apr. 30, 1968

3,380,892
PROCESS OF PURIFYING GLUCOAMYLASE
John T. Garbutt, Muscatine, Iowa, assignor to Grain Processing Corporation, Muscatine, Iowa, a corporation of Iowa
No Drawing. Filed Sept. 10, 1964, Ser. No. 395,599
15 Claims. (Cl. 195—31)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of microbiological origin are most commonly used in industry in the enzymatic saccharification of liquefied starch to form dextrose-containing syrups. The culture filtrates of *Aspergillus phoenicis, Aspergillus diastaticus, Aspergillus usamii* and *Aspergillus niger* produce excellent enzyme systems which hydrolyze liquefied starch to dextrose. Cultures of *Aspergillus niger* are particularly advantageous.

The broth resulting from the fermentation of these organisms generally contains several enzymes having different activities, some of which interfere with the production of dextrose when the enzyme preparation is employed to hydrolyze starch. Thus, for example, in the culture broth of *Aspergillus niger* three predominant enzyme systems have been identified, namely, alpha-amylase, glucoamylase (amyloglucosidase) and transglucosidase. Alpha-amylase attacks gelatinized starch by a random type of splitting of the starch molecule, thus causing a desirable reduction in the viscosity of the gelatinized starch dispersion. This dispersion contains a linear fraction from amylose of polymerized dextrose attached in the alpha-1,4-positions and a branched polymer from amylopectin which also contains alpha-1,4-linkages but in addition has branched positions adjoining with alpha-1,6-linkages.

In contrast to the multi-chain action of alpha-amylase, the action of glucoamylase is thought to be a "single-chain" action where an enzyme molecule attaches to the dextrin and detaches one glucose unit at a time from the dextrose chain and thus theoretically converts the starch quantitatively to dextrose. The action of glucoamylase on dextrin polymers is much more specific at the alpha-1,4-glucosidic bonds than the alpha-1,6-glucosidic bonds in that it will cleave the former type bond approximately 30 times as fast as the latter type bond. One unit of glucoamylase is capable of saccharifying soluble starch at a rate equivalent to one gram of dextrose per hour at 60° C. and pH 4.3 provided that not more than 25 percent of the substrate is saccharified during the assay.

The presence of transglusocidase with glucoamylase in enzyme preparations detracts from the potential yield of dextrose in the hydrolyzate. Transglucosidase is known to catalyze transglucosylation reactions between dextrose, maltose and other intermediate saccarified products. As a result, upon completion of the saccharification reaction saccharides other than dextrose are still present in substantial amounts.

Accordingly, it is highly desirable to separate the desired glucoamylase enzyme from other enzymes, principally tranglucosidase, present in fungal enzyme preparations which, in the hydrolysis of starch, interfere with the formation of dextrose.

The present invention provides a process for purifying glucoamylase-containing fungal enzyme preparations to inactivate and/or separate therefrom enzymes which, in the hydrolyzation of starchy materials, interfere with the production of dextrose. The present invention also provides a process for hydrolyzing starch to obtain high yields of dextrose by subjecting a liquefied starchy material to the action of a purified glucoamylase-containing fungal enzyme preparation from which there has been removed those enzymes which interfere with the production of dextrose.

In accordance with the present invention a glucoamylase-containing fungal enzyme preparation is purified by treating an aqueous dispersion thereof at a pH within the range from about 1.5 to about 3 with a cation which forms a relatively water-insoluble salt with oxalic acid, the treatment being carried out for a period of time to effectively inactivate the transglucosidase. After treatment the aqueous fungal enzyme preparation can be filtered or centrifuged to remove undissolved solids therefrom with the desired glucoamylase remaining in the filtrate.

The aqueous fungal enzyme preparation or culture liquor, in addition to the glucoamylase and transglucosidase enzymes, generally contains varying quantities of organic acids such as gluconic, oxalic and citric acid. The fermentation of microorganisms of the Aspergillus genus is generally carried out under such conditions as to produce relatively large amounts of oxalic acid. In accordance with the present invention, the purification treatment is carried out by treating the glucoamylase and the transglucosidase-containing fungal enzyme preparation at a pH within the range from about 1.5 to 3 with a cation capable of reacting with oxalic acid to form a relatively insoluble salt which precipitates from solution. For the purposes of this application, an insoluble oxalate salt is one whose solubility in water at approximately 20° C. is not more than about 0.1 gram per 100 milliliters. Representative of suitable cations are aluminum, barium, bismuth, cadmium, calcium, cobalt, copper, iron, lead, magnesium, manganese, nickel, strontium and the like. These cations can be employed in the form of their water soluble salts. Representative water soluble salts which can be employed are aluminum acetate, aluminum chloride, barium acetate, barium chloride, calcium acetate, calcium chloride, copper sulfate, iron sulfate, lead sulfate, magnesium chloride, magnesium acetate, nickel acetate, strontium chloride, zinc chloride, zinc sulfate and the like.

Adjustment of the pH to within the range specified is a critical feature of the invention in order to achieve the desired inactivation and removal of transglucosidase activity. It is generally preferred to adjust the pH of the aqueous glucoamylase solution to a value in the range from about 1.8 to 2. Adjustment of the pH to a low value can be accomplished with any suitable mineral or organic acid such as, for example, hydrochloric, sulfuric, phosphoric, acetic and the like. Moreover, it is possible in certain cases to adjust the pH merely by the addition of the specified metal treating agents in the form of salts which provide an acidic medium. Calcium chloride is representative of this type of salt which in solution provides an acidic condition. Other salts which provide this effect include chlorides of barium, aluminum, cadmium, copper, magnesium and zinc, and sulfates of cadmium, manganese and zinc.

The principal object of the process of the present invention is to effectively remove transglucosidase from the culture broth with minimum loss in glucoamylase activity. To this end the process is carried out at a temperature within the range from about 15 to about 50° C. and preferably at a temperature of from about 20 to about 40° C. for a period of time sufficient to substantially inactivate the transglucosidase. Lower temperatures can be used but they become impractical due to the time required to complete the inactivation and to the added cost of cooling the solution. Likewise, higher temperatures such as, for example, 60° C. or higher can be used, but at the higher temperatures inactivation of the desired glucoamylase occurs. The time of treatment can vary from about 10 minutes up to 3 hours or more.

The weight proportion of the metal treating agents which are employed in accordance with the invention can be varied, depending upon the pH at which the treatment is conducted and the amount of transglucosidase present therein. In general, the metals in the form of their salts are employed in accordance with the invention in amounts ranging from about 0.1 to 4.0 percent by weight of the aqueous glucoamylase preparation. As indicated, calcium chloride and other metal salts can be used alone to adjust the pH of the enzyme solution to within the specified pH range. When these salts are employed for the purpose of adjusting the pH as well as for the precipitating effect, greater amounts will ordinarily be required.

One specific preferred embodiment of the process of this invention is carried out as follows: A glucoamylase-containing fungal enzyme culture filtrate, either with mycelium present or after being filtered to remove mycelium, is adjusted to a pH of about 2. Adjustment of the pH is accomplished by adding calcium chloride to the aqueous solution of the filtrate. The temperature of the enzyme liquor is maintained at about 30° C. and the aqueous filtrate agitated for a period of about 60 minutes. After the 60-minute agitation period, the solution is adjusted to pH 3.5 to 4.0 and filtered. The treated glucoamylase enzyme preparation, substantially devoid of transglucosidase activity, can be used for starch conversion in this form or it can be concentrated or it can be precipitated by means of a precipitating agent such as alcohol to obtain the glucoamylase enzyme in dry form.

Several procedures can be employed to evaluate the effectiveness of the purification treatment. The ultimate test is, of course, the ability of the treated enzyme preparation to hydrolyze starch to produce hydrolyzates having high dextrose contents, such as dextrose equivalents (D.E.) of 94 to 98 and above.

The advantages of the invention will be further illustrated by the following specific examples. In these examples enzymes were evaluated for ability to hydrolyze starch. For the hydrolyzate a slurry of cornstarch was adjusted to approximately 30% solids level at a pH of 6–7 and liquefied with bacterial alpha-amylase to a dextrose equivalent (D.E.) from about 10 to 30. The purified enzyme is employed in the hydrolysis of starch in an amount corresponding to one glucoamylase unit per 6 grams of starch.

Transglucosidase activity was estimated qualitatively utilizing thin layer chromatography by the detection of isomaltose and panose resulting from the transglucosylation of maltose on a substrate. This procedure consists essentially of two steps: (1) the reaction of the enzyme on maltose, and (2) detection of the reaction products formed by thin layer chromatography. The relative amount of transglucosidase in a given sample is determined by visually comparing the color density of the isomaltose and panose spots with those obtained with a transglucosidase-free preparation, and a corresponding untreated control fungal amylase preparation. The sugars present are detected by the action of ammoniacal silver nitrate which produces a brown to black color on heating of the chromatoplate.

Example I

Twenty milliliter aliquots of a glucoamylase solution derived from *Aspergillus niger* were distributed in 100 milliliter beakers and held at 25° C. Various levels of calcium chloride were added as shown below and the solution held for one hour. After this period the solutions were filtered and diluted to volume. The solutions were then analyzed for pH, presence of transglucosidase, glucoamylase activity and the ability to saccharify starch hydrolyzate was determined.

| $CaCl_2$ conc., percent | pH | Transglucosidase remaining after treatment | Glucoamylase recovery, percent | D.E. at 65 hr. | D.E. at 89 hr. |
|---|---|---|---|---|---|
| 0.4 | 2.1 | Approx. 50% | (¹) | | |
| 0.6 | 2.0 | Almost none | (¹) | | |
| 0.8 | 1.8 | None | 75 | 100 | 98.4 |
| 1.0 | 1.7 | ----do---- | 53 | 95.4 | 96.7 |
| 1.2 | 1.6 | ----do---- | 48 | 95.7 | 99.2 |
| None | | All | 100 | 93.5 | 94.2 |

¹ Not run.

The results show that about half of the transglucosidase was inactivated by only 0.4% calcium chloride in a treatment that was run for one hour. A level of 0.8% calcium chloride resulted in complete elimination of the transglucosidase.

Example II

Ninety-five (95) liters of a glucoamylase solution derived from a culture of *Aspergillus niger* were treated with sufficient calcium chloride to adjust the pH to 1.8 to 1.9. The preparation was thoroughly mixed and allowed to stand at 25° C. for one hour. The pH was then raised to 3.8 with sodium hydroxide and the preparation was filtered. The recovered broth contained 64% of the glucoamylase activity of the original preparation.

Example III

An untreated glucoamylase concentrate was diluted to a solids concentration of about 25% and adjusted to pH 4.2. Solutions of various metal salts were added up to 1% by weight or until the pH reached 1.9. If the 1% salt solution did not produce a pH of 1.9, sulfuric acid was added to produce this pH. The solutions were then held for one hour at 25° C., readjusted to pH 4.0 with sodium hydroxide and centrifuged. A 1 to 10 dilution was made of the supernatant liquid which was then tested for transglucosidase activity by the thin layer chromatography procedure previously indicated. The test results were as follows:

| Salt | Amount of precipitate formed | Transglucosidase removed |
|---|---|---|
| None | None | No. |
| Lead acetate | Slight | Yes. |
| Magnesium chloride | Moderate | Yes. |
| Calcium acetate | Heavy | Yes. |
| Barium acetate | do | Yes. |
| Strontium acetate | do | Yes. |
| Stannous chloride | Moderate | Yes. |
| Barium chloride | Heavy | Yes. |

Example IV

Utilizing the same procedure as in Example III, additional runs were carried out with the following results:

| Salt | Amount of precipitate formed | Transglucosidase removed |
|---|---|---|
| None | None | No. |
| Cadmium chloride | Heavy | Yes. |
| Zinc sulfate | do | Yes. |
| Manganous sulfate | do | Yes. |
| Cadmium sulfate | do | Yes. |

The use of a low pH and the specified metals are both important in obtaining the advantages of the invention. Without the use of metals the loss of glucoamylase is generally higher, whereas with the use of the metals high recoveries of glucoamylase are obtained. In addition to the removal of transglucosidase, the precipitate occludes other undesirable contaminants, such as undesired color, salts and so forth.

Those modifications and equivalents which fall within the spirit of the invention and the scope of the appended claims are to be considered part of the invention.

I claim:

1. A process of purifying a transglucosidase- and glucoamylase-containing fungal enzyme preparation which comprises treating said preparation in aqueous medium at a pH within the range from about 1.5 to 3 with a metal salt having a cation which forms an insoluble salt with oxalic acid, the metal salt being employed in an amount of at least 0.1% by weight and for a time sufficient to substantially inactivate the transglucosidase enzyme and then separating solids from the glucoamylase preparation.

2. The process of claim 1 wherein the pH is maintained at about 1.8 to 2.

3. The process of claim 1 wherein the treatment is carried out for a period of time ranging from about 0.2 to 3 hours.

4. The process of claim 1 wherein the transglucosidase and glucoamylase-containing fungal enzyme preparation is derived from the Aspergillus genus.

5. The process of claim 1 wherein the transglucosidase and glucoamylase-containing fungal enzyme preparation is derived from *Aspergillus niger*.

6. The process of claim 1 wherein treatment is carried out at a temperature between about 15 and 50° C.

7. The process of claim 1 wherein the treatment is carried out at a temperature between about 20 and 40° C.

8. The process of claim 1 wherein there is employed a water-soluble salt of a metal which forms an insoluble salt with oxalic acid.

9. The process of claim 8 wherein calcium chloride is employed.

10. A process of treating a transglucosidase- and glucoamylase-containing fungal enzyme preparation which comprises adding a strong acid and calcium chloride in an amount of at least about 0.1% by weight to the fungal enzyme preparation in aqueous medium to adjust the pH thereof to a level of about 1.5 to 3, maintaining said preparation at a temperature between 15 and 50° C. for a time sufficient to substantially inactivate the transglucosidase enzyme and then separating solids from said glucoamylase.

11. A process of treating a transglucosidase- and glucoamylase-containing fungal enzyme preparation which comprises adding a strong acid and calcium chloride in an amount of at least about 0.1% by weight to the fungal enzyme preparation in aqueous medium to adjust the pH thereof to a level of about 1.8 to 2, maintaining said preparation at a temperature between about 15 and 50° C. for a time sufficient to substantially inactivate the transglucosidase enzyme and then separating solids from said glucoamylase.

12. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium at a pH within the range from about 1.5 to 3 with a metal salt having a cation which forms an insoluble salt with oxalic acid, the metal salt being employed in an amount of at least 0.1% by weight and for a time sufficient to substantially inactivate the transglucosidase enzyme and then separating solids from the glucoamylase preparation.

13. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium with calcium chloride in an amount of at least about 0.1% by weight and at a pH of from about 1.5 to 3 for a period of time sufficient to substantially inactivate the transglucosidase enzyme and separating solids from said purified glucoamylase preparation.

14. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium at a temperature of from about 20 to 40° C. and a pH of from about 1.8 to 2 with a metal salt having a cation which forms an insoluble salt with oxalic acid, the metal salt being employed in an amount of at least 0.1% by weight and for a period of time sufficient to substantially inactivate the transglucosidase enzyme and then separating solids from the glucoamylase preparation.

15. The process of claim 1 wherein the said metal salt is employed in an amount of from about 0.1 to 4% by weight of the fungal enzyme preparation.

References Cited
UNITED STATES PATENTS

| | | | |
|---|---|---|---|
| 3,047,471 | 7/1962 | Hurst et al. | 195—66 |
| 3,067,108 | 12/1962 | Hurst et al. | 195—31 |
| 3,117,063 | 1/1964 | Hurst et al. | 195—31 |
| 3,134,723 | 5/1964 | Corman | 195—66 |

LIONEL M. SHAPIRO, *Primary Examiner.*

A. LOUIS MONACELL, *Examiner.*